Sept. 2, 1958     W. H. DU SHANE     2,849,892
CONTROL LEVER MOUNTING OR LIKE CONNECTION
Filed July 13, 1956
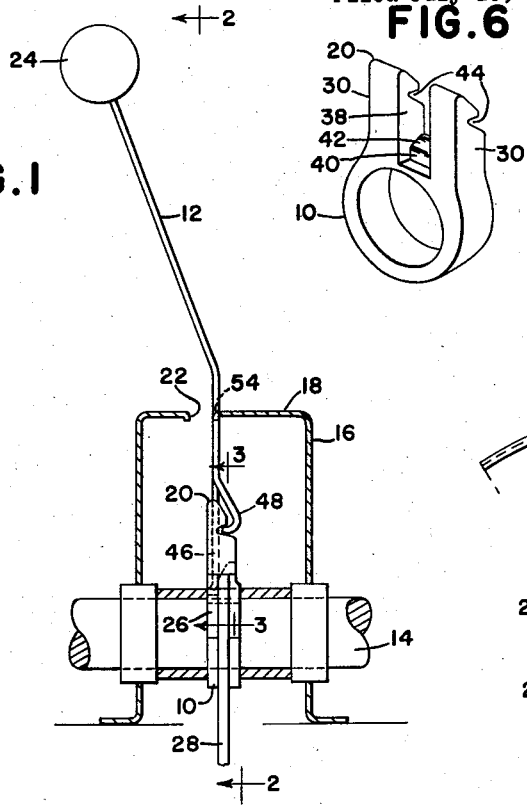
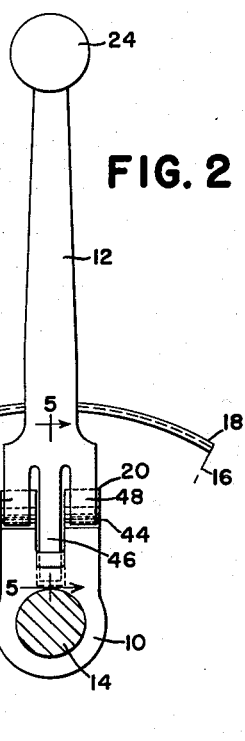
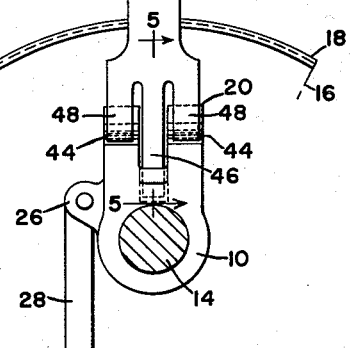
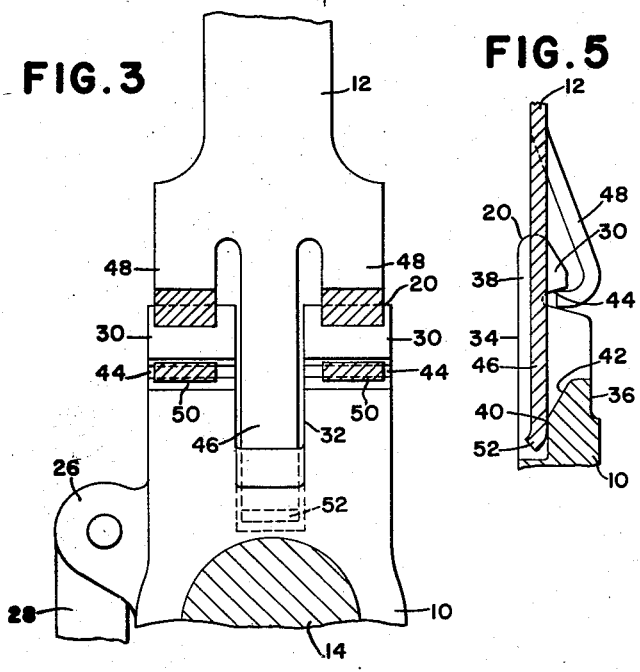
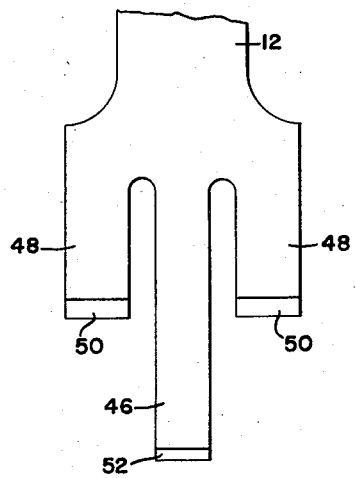
INVENTOR.
W. H. DuSHANE

United States Patent Office 2,849,892
Patented Sept. 2, 1958

2,849,892
CONTROL LEVER MOUNTING OR LIKE CONNECTION

Wallace H. Du Shane, Waterloo, Iowa, assignor to Deere Manufacturing Company, Dubuque, Iowa, a corporation of Iowa Application July 13, 1956, Serial No. 597,673

11 Claims. (Cl. 74—524)

This invention relates to improved means for interconnecting two members, and is directed primarily although not exclusively to the interconnection of a control member to a supporting arm or block on a rockshaft or the like.

The invention finds particular utility in a control arrangement in which the lever projects through a slot in a control panel for controlling mechanism housed in part within the panel. In installations of this type, it is difficult to remove and replace the lever without disassembling the panel and in many instances it is undesirable to disassemble the panel, whereupon it becomes necessary to provide a suitable releasable connection for the lever so that it can be inserted or withdrawn through the slot. The principal object of the present invention is generally to improve lever mountings or like connections of the general character referred to.

An important object of the invention is to afford a connection between a pair of members in which the connection is effected by specially shaped interlocking portions on the members which normally resist separation of the members but which may be forcibly distorted or deflected to enable separation of the members. Specifically it is an object to utilize this type of connection in a control lever mounting for enabling the insertion and withdrawal of a control lever through a control panel slot. Further features of the invention reside in means in the connection enabling the two connected members to transmit torque about a rockshaft axis or the like, to afford a control lever arrangement in which the bias incorporated in the connection is useful also in maintaining the position of the control lever relative to the control panel, and generally to provide an improved and economical design.

The foregoing and other important objects and desirable features inherent in and encompassed by the invention will become apparent as a preferred embodiment thereof is disclosed, by way of example, in the ensuing specification and accompanying sheet of drawings, the several figures of which are described immediately below.

Fig. 1 is a front view, partly in section, of the improved lever mounting.

Fig. 2 is a view as seen along the line 2—2 of Fig. 1.

Fig. 3 is an enlarged sectional view as seen along the line 3—3 of Fig. 1.

Fig. 4 is a detail of the lower end of the lever.

Fig. 5 is an enlarged fragmentary section as seen along the line 5—5 of Fig. 2.

Fig. 6 is a perspective of the mounting block.

A mounting block 10 and a control lever 12 are representative of first and second members interconnected by the improved connection according to the present invention. In a control lever arrangement, such as illustrated, the block 10 is carried on a rockshaft 14 which is enclosed in part by a housing 16 having an arcuate panel 18 concentric about the rockshaft axis. The block 10 has a terminal portion 20, here its upper portion, which is radially short of the panel 18 and the lever and block are interconnected in end-to-end relationship, the lever 12 projecting through a circumferentially directed slot 22 in the panel to an outer terminal end conveniently equipped with a hand knob 24. The block 10 has an ear 26 by means of which a pivotal connection may be made to a control link 28 for controlling any of a variety of mechanisms by means of the lever 12.

The upper terminal portion of the block 10 is bifurcated to provide a pair of upstanding legs 30 separated by a slot 32, and the block has opposite sides 34 and 36 disposed generally radially as respects the axis of the rockshaft 14. The side 34 has a radial recess or pocket 38 which opens at the upper terminal portion 20 between the legs 30 and which terminates at the rockshaft-receiving hub of the block. The recess 38 is defined by an upright side portion 40 that is set back from the side 34 and the portion 40 continues upwardly and toward the side 36 as a ramp or taper 42 (Fig. 5). Each of the legs 30, at the side 36, tapers upwardly toward the terminal portion 20 and below this portion each leg has a tapered groove 44. The grooves are alined on a chord of a circle concentric with the rockshaft 14.

The lower or inner end of the lever 12 is tined, having a central elongated tine 46 and a pair of outer tines 48 flanking the central tine. The lever is constructed of resilient material, such as steel or its equivalent and the tines possess an inherent biased relationship in which they tend to seek a common plane. In the assembled connection, the central tine 46 lies at the side 34 of the block 10 and the outer tines 48 lie at the opposite side 36 of the block. Specifically, the central tine 46 lies in the recess 38 and its lower end abuts the side portion 40, and the outer tines 48 respectively have free hooked lower ends 50 which hook into the grooves 44 in the legs 30 of the block. In view of the biased relationship mentioned above, the tines grip the block securely therebetween and the hooked relationship at 44—50 prevents tensional separation of the lever and block. Furthermore, the wedging relationship between the hooked ends 50 of the tines 48 and the tapered grooves 44 increases the effectiveness of the connection and enables the lever and block to move in unison for the transmission of torque to the control link 28. Thus, the tines 48 and groove 44 afford means engageable between the lever and the block for effecting a releasable connection. This connection may be separated or released by forcibly deflecting the tines 48, as by a screw driver or similar tool inserted from in front and back of the lever, whereby the hooked ends 50 are withdrawn from the grooves 44, a tensional force being simultaneously applied to the lever. In view of the tapered portions on the terminal portion 20 of the block, insertion of the lever through the slot 22 and then over the block is an easy matter. As best shown in Fig. 5, the legs 30 taper upwardly from the grooves 44 and the taper 42 at the side portion 40 cooperates with a rounded lower edge 52 on the central tine to facilitate assembly. Hence, the lever may be disconnected from the block without disturbing the housing 16.

In the specific embodiment shown, the inherent bias between the tines 46 and 48 will tend to move the lever 12 to the right as seen in Fig. 1. Thus, advantage is taken of this biased relationship to establish cooperation between the lever 12 and the right hand edge of the panel slot 22, as for retaining the lever in a selector notch, such as is suggested at 54. The operator may readily force the lever 12 to the left so as to free it from the notch, after which he may rock the lever and block 10 in unison about the axis of the rockshaft. In this regard, the engagement between the hooked ends 50 of the tines 48 and the grooves 44 establishes fulcrum means transverse to the rockshaft so that the lever is rockable laterally in the manner just described, which rocking is resisted by the finger or tine 46.

Features of the invention not categorically enumerated will readily occur to those versed in the art, as will many modifications and alterations in the preferred embodiment illustrated, all of which may be achieved without departing from the spirit and scope of the invention.

What is claimed is:

1. A lever mounting, comprising: a rockshaft; a panel spaced radially from the rockshaft and having therein a slot directed circumferentially as respects the rockshaft; a block member on the rockshaft and projecting radially toward said panel to a terminal portion short of said panel and having opposite sides extending back from said terminal portion disposed radially as respects the rockshaft; a lever extending through the panel slot generally as an elongation of the block member and having an inner tined end, radially inwardly of said panel portion, provided with a central tine projecting radially inwardly past said terminal portion of the block member and overlapping one side of said block member and a pair of outer tines flanking said central tine and overlapping the other side of said block member, said tines being biased relative to each other toward a common plane so as to grip the block member between said central tine at one side and said outer tines at the other side of said block member; and means engageable, via the aforesaid biased relationship, between at least one of the tines and the block member for effecting a connection operative to enable rocking of the block member and lever in unison about the rockshaft axis, said means being releasable by forcible deflection of at least said one tine in opposition to said biased relationship so as to free the tines from the block member for radial separation of the lever from the block member, said slot having such width as to enable radially outward withdrawal of the tined end of the lever therethrough.

2. The invention defined in claim 1, in which: the engageable and releasable means comprises free hooked ends respectively on the outer tines and groove means in the block member respectively receiving said hooked ends.

3. The invention defined in claim 2, in which: the hooked ends of the outer tines and the groove means lie generally on a chord of a circle having the rockshaft as a center so as to improve the force-transmitting characteristics of said means.

4. The invention defined in claim 3, in which: the free hooked ends and the groove means include cooperative portions effecting a wedging action that is increased by the aforesaid biased relationship of the tines on the block member.

5. The invention defined in claim 1, in which: the terminal portion of the block member is tapered toward the panel portion and the free ends of the tines are in divergent relationship so as to facilitate radially inward connection of the lever to the block member.

6. The invention defined in claim 1, in which: the side of the block member overlapped by the central tine has a radial recess for receiving said central tine.

7. The invention defined in claim 1, in which: the engageable and releasable means includes a fulcrum transverse to the rockshaft so that the lever is rockable laterally relative to the block against the force of said biased relationship of the tines.

8. A connection of the class described, comprising: first and second members arranged in end-to-end relation; said second member having a central tine projecting past the free end of the first member in overlapping relation to one side of said first member and a pair of outer tines flanking said central tine and overlapping the other side of said first member; said outer tines respectively having free hooked ends directed toward said other side of the first member; said other side of said first member having groove means therein respectively receiving said hooked ends; and said tines being biased relative to each other toward a common plane so as to grip the first member between said central tine at the one side and the outer tines at the other side.

9. The invention defined in claim 8, in which: the groove means is wedge-shaped to tightly receive the hooked ends of said outer tines.

10. The invention defined in claim 8, in which: the opposite sides of the first member are tapered toward the free end of said first member and the free ends of the tines have laterally divergent portions facilitating end-to-end receipt of the first member by the tines.

11. A connection of the class described, comprising: first and second members arranged in end-to-end relation; said second member having a central tine projecting past the free end of the first member in overlapping relation to one side of said first member and a pair of outer tines flanking said central tine and overlapping the other side of said first member; said tines being biased relative to each other toward a common plane so as to grip the first member between said central tine at the one side and the outer tines at the other side; and means engageable between at least one tine and the first member and operative via said biased relationship of the tines to normally prevent tensional separation of the members, said means being releasable upon forcible relative deflection of the tines in opposition to said biased relationship.

No references cited.